Patented July 27, 1926.

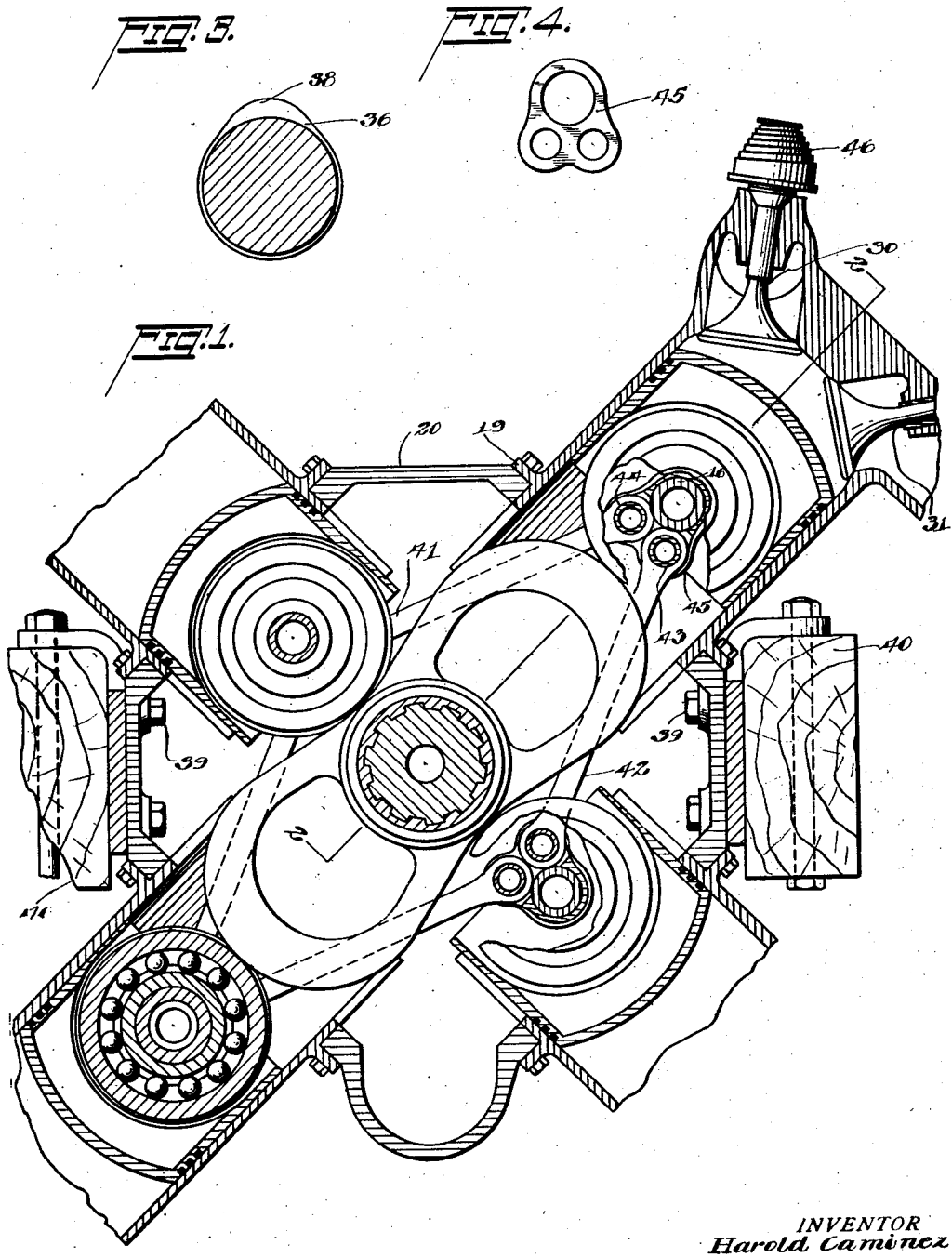

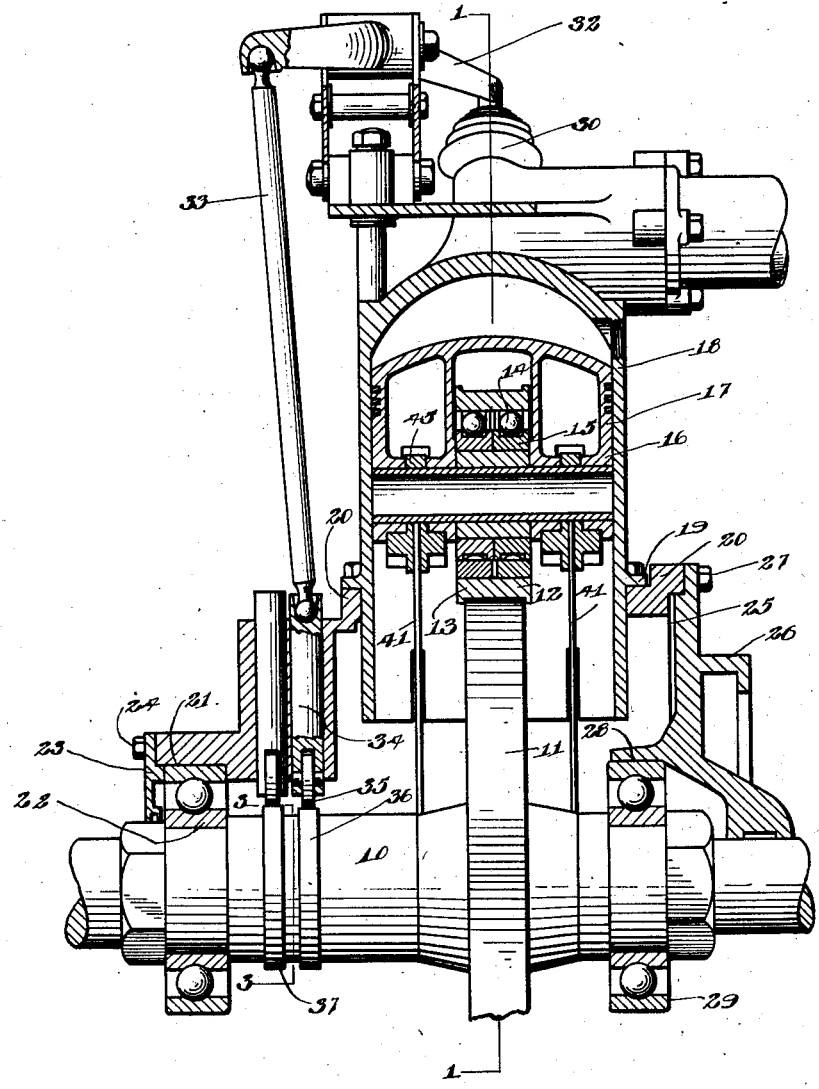

1,594,045

UNITED STATES PATENT OFFICE.

HAROLD CAMINEZ, OF DAYTON, OHIO.

CAM ENGINE.

Application filed March 31, 1924. Serial No. 703,211.

This invention relates to engines of the reciprocating piston type in which a novel means is used for converting the reciprocating motion of the pistons into rotary motion of the drive shaft. An engine constructed in accordance with my invention will be much lighter per horsepower, more compact, have fewer and sturdier parts and have better operating characteristics than engines heretofore produced.

In the employment of my invention an engine is provided of the internal combustion type in which the pistons are attached together by a flexible interconnection and are provided with a bearing roller engageable with a cam provided on the main engine shaft. The flexible interconnection and the cam shape are so designed that the bearing rollers are constrained to follow the outline of the cam at all times. In the embodiment shown the flexible interconnection takes the form of links, and an equalizer is provided in the link connection to equalize the strain on the various links.

Various other objects and advantages will be more fully set forth in the following description and claims and in the drawings, in which—

Fig. 1 is a central vertical section on the line 1—1 of Fig. 2, showing two of the piston rollers broken away.

Fig. 2 is a central vertical section on the line 2—2 of Fig. 1.

Fig. 3 is a section on line 3—3 of Fig. 2 showing the valve operating cam, and

Fig. 4 is a detailed view of the equalizer.

In the preferred embodiment is shown an engine of the four cylinder type in which the cylinders are radially arranged about the central rotatable drive shaft 10. Mounted upon this central shaft 10 by means of a suitable spline is a main cam 11 shaped generally like the figure 8. This cam is engaged by a ball bearing roller 12 which is shown as consisting of an outer ring 13, balls 14, and inner ring 15, this inner ring being suitably fitted upon a piston pin 16 in each piston 17.

The four pistons 17 are arranged each in a cylinder 18, it being noted that the cylinders are provided as units on each of which is a flange 19 by which it is attached to a housing member 20, provided with four holes to receive the various cylinders. On one side of the cylinders the housing member 20 is provided with a bore 21 within which is fitted a ball bearing member 22 so as to support the shaft by means of anti-friction bearings from the housing member. An end retainer 23 is attached by means of bolts and nuts 24 to the housing member. On the other side of the cylinders the housing member 20 is provided with a large opening 25 so that assembly and disassembly is facilitated. An end plate 26 is attached by means of bolts and nuts 27 to the housing 20 and this end plate is provided with a bore 28 within which a ball bearing 29 is fitted, bearing 29 serving to support the opposite end of the main shaft 10.

Each cylinder is provided with an intake valve and an exhaust valve designated 30 and 31 which are operated by means of rocker arms 32, each rocker arm being engaged by valve push rod 33, the lower end of which is socketed in a valve tappet plunger 34, the lower end of the plunger being supplied with a roller 35 engaging with a cam 36 more fully shown in Fig. 3. This cam operates the inlet valves 30. A similar cam 37 and valve arrangement is also provided for the exhaust valves 31. Valve springs 46 are provided to close the valves. The two cams 36 and 37 are each provided with a single projection or lobe 38 so that the valves will be operated once for each full revolution of the main shaft 10, the same cams 36 and 37 operating all of the valves of the engine.

The engine is suitably mounted by means of bolts and nuts 39 which attach the main housing 20 to a suitable sill or other main bearing member 40 one of which is provided on each side of the engine. In the embodiment shown the engine is of the four cylinder four cycle stationary radial cylinder type, the shaft being caused to rotate by means of the cam being acted upon by the inward pressure of the various pistons as the charges in the various cylinders expand after they are exploded.

In order to assure that the piston rollers 12 follow the outline of the cam 11 and maintain a bearing relation against it at all times, the pistons are connected together by a flexible interconnection shown as including links 41 and 42 which maintain the points on the pistons which they interconnect, always spaced the same distance apart. The cam 11 is so designed that the shape of the periphery is such that the interconnections will maintain the pistons always in bearing relation to the cam. In designing the cam, any suitable outline is selected for a quarter of the cam and the remaining part of the periphery is determined from the length of the links, stroke, and the points on the pistons to which the links are connected. Where four pistons are interconnected the cam must have at least two lobes although more may be used if desired.

It will thus be seen that the forces on the piston acting toward the cam center are transmitted by the rollers directly to the cam. The forces on a piston acting away from the cam center are transmitted to adjacent pistons by the links 41 and 42. If the links 41 and 42 are pivotally connected directly to adjacent pistons, as where they are connected directly to the piston pins, an outward force of a piston would produce an inward force of adjacent pistons, but would also result in pressure between the pistons and the cylinder walls in these adjacent pistons. The links 41 and 42 are therefore connected by means of pins 43 and 44 respectively to an equalizer 45 which is rotatably mounted upon the piston pin 16 of each piston. The equalizers 45 oscillate on the piston pins during operation to a very minute degree so that a force on a piston away from the cam, which would otherwise have a component producing side pressure on the adjacent pistons, would be transmitted by the links to all other pistons. The forces in the links are thereby equalized at all times by the equalizers 45. Links 41 and 42 are arranged in pairs, a pair of links being provided on each side of each piston axis. The links are arranged so that they are at equal distances from the center axial plane of the cam 11 and in this manner all unnecessary strains are avoided. The point of attachment of an equalizer to the piston pin is within the outlines of the piston proper.

The cam 11 being of the double lobe variety results in four complete strokes of each piston for every revolution of the shaft. In a four cycle engine an explosion or power stroke occurs in the cylinder at every fourth stroke, and the intake and exhaust strokes during which the inlet and exhaust valves are respectively held open, occur in the same sequence. It is therefore possible to operate the cylinder valves directly from single lobe cams mounted directly upon the main drive shaft, one cam being provided to operate all the inlet valves and another cam operating all the exhaust valves of the engine.

Due to the nature of the construction of the engine, it is possible to provide anti-friction bearings, such as bearings of the ball or roller type, at all important bearing connectings, such as the bearing holding the drive shaft 10 within the housing, and the bearings whereby the rollers 12 are connected to the piston pins.

I am aware that my invention is susceptible of various interpretations and adaptations and I do not desire to be limited to the precise construction selected for purposes of illustration.

What I claim as new and desire to secure by Letters Patent is:

1. In a device of the class described, in combination, a shaft, a non-circular track arranged around said shaft, a number of cylinders arranged radially about said shaft, pistons adapted to reciprocate in said cylinders, said pistons having a bearing relation with said track, means for maintaining the pistons in bearing relation to said track comprising a plurality of angularly related links interconnecting said pistons and means for equalizing the stresses in said links.

2. In an engine, in combination, a shaft, a non-circular track arranged around said shaft, a number of cylinders exceeding three in number arranged radially about said track, pistons adapted to reciprocate in said cylinders, said pistons having a bearing relation with said track, and means for maintaining the pistons in bearing relation to the track comprising a plurality of links interconnecting adjacent pistons and an equalizer for each piston to which the links are connected to equalize the stresses in said links.

3. In a device of the class described, in combination, a shaft, a non-circular track arranged around said shaft, a number of cylinders radially arranged about said shaft, pistons adapted to reciprocate in said cylinders, anti-friction rollers carried by said pistons and bearing on said track, means for retaining the rollers in bearing relation to said track, said means comprising a set of links interconnecting all said pistons and means for equalizing the stresses in all of the links of said set.

4. In a device of the class described, in combination, a shaft, a non-circular track arranged radially around said shaft, a number of cylinders arranged radially about said shaft, pistons adapted to reciprocate in said cylinders, anti-friction devices carried by said pistons and bearing on said track, means for retaining the anti-friction devices in bearing relation to said track, said means comprising a plurality of links arranged in pairs interconnecting said pistons, the links of each pair being situated on the same side of the track and connected to the same piston, and an equalizer interconnecting a pair of links and a piston to equalize the stresses in the links of said pair.

5. In an engine, in combination, a shaft, a non-circular cam track arranged radially around said shaft, a number of cylinders arranged radially about said shaft, pistons adapted to reciprocate in said cylinders, rollers carried by said pistons and bearing on said track, means for retaining the rollers in bearing relation to said track, said means comprising a plurality of links and a member movably connected to each piston to which the links are attached, the point of attachment of a link to a member being outside of the planes of symmetry of the piston.

6. In an internal combustion engine, in combination, a shaft, a non-circular cam track arranged around said shaft, a number of cylinders arranged radially about said shaft, pistons adapted to reciprocate in said cylinders, devices carried by said pistons and bearing on said track, means for retaining the devices in bearing relation to said track, said means comprising a plurality of links arranged in angularly related pairs and an equalizer pivotally connected to each piston for oscillating movement about an axis, a pair of links being connected to an equalizer for relative movement about a line removed from said axis.

7. In an engine in combination, a shaft, a non-circular cam track arranged radially around said shaft, a number of cylinders arranged radially about said shaft, pistons adapted to reciprocate in said cylinders, rollers carried by said pistons and bearing on said track, means for retaining the rollers in bearing relation to said track, said means comprising a plurality of links and a member movably connected to each piston to which the links are attached, and a piston pin for each piston for interconnecting said member and its corresponding piston.

8. In an internal combustion engine, in combination, a shaft, a non-circular track arranged around said shaft, a number of cylinders arranged radially about said track, pistons adapted to reciprocate in said cylinders, said pistons being arranged symmetrically around said track, a piston pin for each piston, an anti-friction roller mounted on said pin, a short link pivoted on said pin at one end and pivotally connected at its other end to a long link, said long link serving to interconnect a short link of one piston to an adjacent piston.

9. In a four-cycle internal combustion engine, a shaft, a non-circular track arranged around said shaft, a number of cylinders arranged radially about said shaft, pistons adapted to reciprocate in said cylinders, said pistons being arranged symmetrically around said track and in bearing relation against the same, means for maintaining the pistons in bearing relation to said track, said means comprising a flexible connection interconnecting all of said pistons, and an equalizer pivotally connected to each piston for equalizing the strain in all parts of said flexible connection.

10. In an internal combustion engine, in combination, a shaft, a non-circular track arranged around said shaft, a number of cylinders arranged radially about said track, pistons adapted to reciprocate in said cylinders, said pistons being arranged symmetrically around said track, a piston pin for each piston, an anti-friction roller mounted on said pin, an equalizing link mounted on each piston pin at each side of the roller, and a set of links interconnecting the equalizing links on similar sides of the rollers, said links being pivoted to the equalizing links at points inwardly and laterally removed from the piston pin axes.

11. In an engine as set forth in claim 7, said links being arranged in two sets, one set on each side of the cam, the links in each set being all situated in the same plane.

12. In an engine as set forth in claim 10, the links of each set all being situated in the same plane.

In testimony whereof I affix my signature.

HAROLD CAMINEZ.